United States Patent [19]

Deyer

[11] Patent Number: 4,538,027
[45] Date of Patent: Aug. 27, 1985

[54] SYSTEM FOR INPUTTING A SECURITY CODE TO A COMPUTER

[75] Inventor: Craig E. Deyer, Akron, Pa.

[73] Assignee: RCA Corporation, Princeton, N.J.

[21] Appl. No.: 402,426

[22] Filed: Jul. 28, 1982

[51] Int. Cl.³ .............................................. H04K 1/00
[52] U.S. Cl. ............................ 178/22.01; 178/22.08; 178/22.09; 364/900
[58] Field of Search ............... 178/22.01, 22.02, 22.08, 178/22.09, 22.18, 22.19; 364/200, 900; 340/365

[56] References Cited

U.S. PATENT DOCUMENTS

| 4,133,973 | 1/1979  | Branscome et al. | 178/22.18 |
| 4,171,513 | 10/1979 | Otey et al.      | 178/22.17 |
| 4,281,216 | 7/1981  | Hogg et al.      | 178/22.08 |
| 4,282,516 | 8/1981  | Tults            | 340/365   |
| 4,304,961 | 12/1981 | Campbell, Jr.    | 178/22.08 |
| 4,310,720 | 1/1982  | Check, Jr.       | 178/22.08 |
| 4,321,695 | 3/1982  | Redwine et al.   | 365/174   |
| 4,346,369 | 8/1982  | Macy             | 340/365   |
| 4,404,426 | 9/1983  | Safford          | 178/22.19 |
| 4,405,978 | 9/1983  | Lange et al.     | 364/200   |
| 4,443,789 | 4/1984  | Endfield et al.  | 340/365   |

Primary Examiner—Salvatore Cangialosi
Attorney, Agent, or Firm—E. M. Whitacre; L. L. Hallacher; T. H. Magee

[57] ABSTRACT

A system for providing a security code to a computer includes security bit input logic for each bit of the security code. The input logic includes a plurality of output lines whereby the security bit can be provided on any combination of the output lines selected. Output line selection logic selects the output line over which the bit is provided. The input logic is sequentially scanned whereby the security bits are sequentially provided to the computer.

9 Claims, 1 Drawing Figure

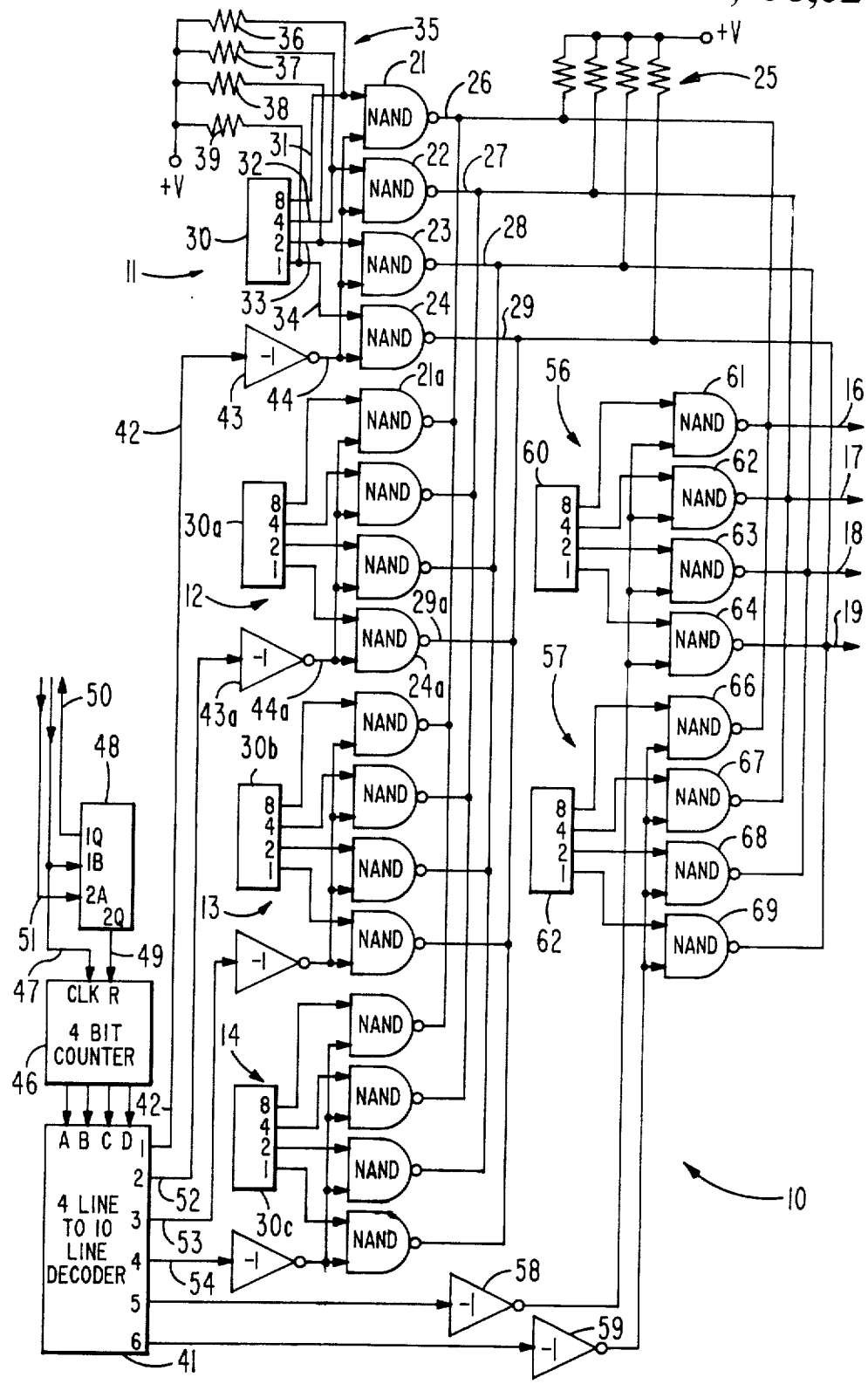

SYSTEM FOR INPUTTING A SECURITY CODE TO A COMPUTER

BACKGROUND OF THE INVENTION

This invention relates generally to computer controlled systems, and particularly to a system for inputting a security code to such a system. Typically, computer controlled systems are provided with a security code which prevents the use of the system by anyone who does not know the code. The security code is hardwired into the computer and the operator uses a a keyboard to manually input the same code to the computer prior to using the system. Security against unauthorized use can be greatly increased by periodically changing the security code. The security code typically is changed by selecting a new code and setting the computer to respond to this code. Authorized operators are informed of the new code and input the new code to the system as the first step in using the system. For this reason, there is a need for a system which enables an operator to input any one of a large number of security codes to a computerized system. The instant invention fulfills this need by the provision of a system for individually inputting the security code pulses to a computer controlled system.

CROSS REFERENCES TO RELATED PATENT APPLICATIONS

The following patent applications, filed of even date herewith by Craig E. Deyer, describe systems which can be used in a computer controlled system employing the instant invention.

Application Ser. No. 402,546 (RCA 78,168) entitled "Switch Arrangement For Accessing A Computer".

Application Ser. No. 402,544 (RCA 78,169) entitled "System For Inputting A Selected One Of A Plurality Of Inputs To A Computer".

Application Serial No. 402,545 (RCA 78,170) entitled "System For Providing Multi-Bit Input To A Computer Controlled System", now U.S. Pat. No. 4,513,394.

Application Ser. No. 402,428 (RCA 78,171) entitled "System For Converting The Frequency Of A Pulse Train To A Binary Number", now U.S. Pat. No. 4,499,588.

Application Ser. No. 267,750 entitled "System And Method For Controlling The Exposure Of Color Picture Tube Phosphor Screens", and application Ser. No. 267,991 entitled "System And Method For Intermittently Moving A Picture Tube Panel On A Lighthouse", and application Ser. No. 267,749 entitled "System And Method For Determining The Light Transmission Characteristics Of Color Picture Tube Shadow Masks", all filed on May 28, 1981 by W. R. Kelly and E. J. Alvero describe a lighthouse control system which can receive access commands from the instant invention.

SUMMARY OF THE INVENTION

A system for providing a security code to a computer controlled system includes input means for individually providing the bits of the code. Each of the input means includes a plurality of output lines and output line selection means whereby the security bit is provided on a selected combination of the output lines. The input means are scanned to sequentially provide the security code bits to the computer.

BRIEF DESCRIPTION OF THE DRAWING

The Figure is a block diagram of a preferred embodiment of the instant invention.

DETAILED DESCRIPTION OF THE PREFERRED EMBODIMENT

In the Figure, a system 10 for inputting a multi-digit security code to a computer controlled system includes a plurality of identical security input logic circuits 11, 12, 13 and 14 which sequentially and individually provide the security code digits to a computer controlled system over output lines 16, 17, 18 and 19, respectively. The security digit input logic circuit 11 includes a plurality of NAND Gates 21-24 respectively having output lines 26-29. The output terminals of a binary coded decimal (BCD) switch 30 are individually connected by output lines 31-34 to one of the input terminals of the NAND Gates 21-24, respectively. A resistance network 35 includes biasing resistors 36-39 to respectively bias the output lines 31-34 of the BCD switch 30 to a high state. The output lines 26-29 are biased normally high by a resistance network 25. The NAND Gates 21-24 are open collector gates. Accordingly, the state where the output is high is the high impedance state in which the internal transistor is turned off. When both input terminals are high, the internal transistor is turned on to ground the output terminal and pull the respective output line 26-29 to a low. Thus, when any of the NAND Gates 21-24 receives two high inputs, one of the lines 26-29 goes low. The lines 31-34 are grounded through the BCD switch 30 and thus are normally low. The NAND Gates 21-24 are enabled by closing the BCD switch 30 and disconnecting a combination of the output terminals "1", "2", "4" or "8" from ground causing a combination of the lines 31-34 to go high and enable a combination of the NAND Gates 21-24. For example, the NAND Gate 23 can be enabled by actuating the BCD switch 30 such that the "2" output terminal goes high.

The other input terminals of the NAND Gates 21-24 are connected to the "1" output terminal of a four line to ten line decoder 41, by a line 42, an inverter 43 and a line 44. The output terminals numbered 1-6 of the decoder 41 are normally high. The decoder 41 is commercially available and, for example, can be a Texas Instruments SN74LS42 decoder. The high available on the output terminal "1" and the line 42 is inverted to a low by the inverter 43 and the input line 44 also normally inhibits the NAND Gates 21-24. The output terminals of a four bit counter 46 are coupled to the input terminals of the decoder 41. The counter 46 receives the same clock pulses as the other elements of the computer controlled system over an input line 47. The counter 46 also receives a reset pulse from a dual one-shot multivibrator 48 over a line 49 at the beginning of a read sequence. The A input of the multivibrator 48 receives an interrogation pulse from the computertized system by way of an input line 51. The counter 46 is commercially available and, for example, can be a Texas Instruments SN74LS93 counter.

The security code is a number set into the system using the BCD switches 30-30c and read into the computer. This number is later compared to a number which is entered from an operator keyboard to determine whether or not the person at the keyboard is authorized to use the system. For example, the security code number can be 4715 and the digits are set using the switches 30, 30a, 30b and 30c, respectively. The number is read by the computer as a string of ASC II characters and stored for security code usage. When an intended operator makes entries on the keyboard, the computer compares the entries by the intended operator with the stored number to determine whether the intended operator is authorized to use the system. The security code can be changed by merely setting a different number into the computer using the BCD switches 30 to 30c. In the figure, the output lines 16–19 are normally high. Typically these highs are inverted by an inverter, not shown, in each of the lines 16–19 so that the computer normally is presented low by each of the lines. The computer reads the highs which are developed on the lines 16–19 for each digit of the security code. The most significant digit of the security code is the first digit made available to the computer. The presence of the highs on the proper output lines verifies the correct security code for that particular digit. The absence of the highs on the proper lines, or the presence of a high on any of the other output lines, indicates that the security code is wrong and the computer will not receive additional commands. For example, the most significant digit is provided by the logic circuit 11. When the security code is set for the exemplary number 4715, the switch 30 is actuated so that the 4 output terminal and line 32 go high. When the decoder 41 responds to the first count from the counter 46, the line 44 goes high and the NAND Gate 22 receives two high inputs cuasing the lines 27 and 17 to go low. The low on line 17 is inverted by the inverter, not shown, to present a high to the computer. The "7" digit of the security number 4715 is presented to the computer on the second count from the counter 46 by actuating the BCD switch 30a so that the "4", "2", and "1" output terminals go high whereby the lines 17, 18, and 19, after being inverted, present highs to the computer. The "1" and "5" digits of the security code are sequentially presented to the computer by setting the BCD switches 30b and 30c, respectively.

In operation, initially, all output terminals "1" to "6" of the decoder 41 are high. A device interrogation pulse is received from the control system by the dual one-shot 48 from the line 51 to enable the one-shot and reset the counter 46 to zero. The system clock pulses are applied to the dual one-shot 48 and the four bit counter 46 by the line 47. When the one-shot 48 times out the Q output goes high and the line 50 presents a pulse to the computer which causes the computer to read data on the output lines 16–19. The first clock pulse causes the counter 46 to increment one count and the "1" output terminal of the decoder 41 goes low. This low is applied by the line 42 to the inverter 43 and the output line 44 goes high to enable the NAND Gates 21-24. A combination of the NAND Gates 21 to 24 has previously been enabled by the actuation of the BCD switch 30. Accordingly, the enabled NAND Gates cause the lines 26 to 29 to go low, and cause the selected lines 16 to 19 also to go low. The second clock pulse to the four bit counter 46 causes "2" output terminal of the decoder 41 to go low and the "1" output terminal of the decoder 41 revert to high. The low on the "2" output terminal of the decoder 41 is applied by the line 52 to the inverter 43a to enable the NAND Gates 21a-24a. The output terminals "1", "2", "4", or "8" of the BCD switch 30a have previously been set by the operator to place the second digit of the security code onto the output lines 16 to 19. The third clock pulse from the four bit counter 46 causes the "3" output terminal of the decoder 41 and the line 53 to go low and the logic circuit 13 provides a security code digit to the output lines 16–19. The fourth clock pulse provides the least significant digit of the security code by way of the logic circuit 14. The four digits of the security code, therefore, are individually and sequentially applied to the output lines 16 to 19 by the logic circuits 11 to 14, respectively.

Additional logic circuits 56 and 57, which are arranged identically to the logic circuits 11-14, are coupled to the "5" and "6" output terminals of the decoder 41 through inverters 58 and 59, respectively. The logic circuits 56 and 57 take advantage of unused output terminals of the decoder 41 and can be used to input operational information into the system. As an example, the instant invention can be used in the control system of a 3-to-1 lighthouse which is used to place the black matrix on the inside surface of the faceplate panel of a color kinescope. In placing this matrix on the panels, a photosensitive material is coated onto the inside surface of the panel and a shadow mask is inserted into the panel. The panel is then exposed to light which passes through the apertures in the shadow mask to expose the photosensitive material. Subsequently, the unexposed photosensitive material is washed away leaving a series of lines which eventually form the black matrix. The shadow mask light transmission capability is different for different tube sizes and types. Accordingly, the light transmission capability of the shadow mask must be provided to the control system to assure that the proper exposure time and light intensity are used. The light transmission capability is called cell size and shadow masks typically are categorized into cell size groups to identify various light transmission capabilities. The number of cell size groups for a particular shadow mask also can vary, and this information also must be provided to the control system. The logic circuits 56 and 57 can be used to identify the number of cell size groupings to the computer by the settings of the output terminals of BCD switches 60 and 62.

When the instant invention is used for both security code and cell size input purposes, the decoder 41 continues to receive count pulses from the counter 46 after the complete security code is applied to the system. The fifth clock pulse makes the "5" output terminal go low to enable the NAND Gates 61 to 64. The sixth count makes the "6" output terminal of the encoder 41 go low to enable the NAND Gates 66–69.

I claim:

1. A system for inputting a multi-bit security code to a computer comprising:
   a plurality of security bit input means for individually providing the bits of said security code, each of said security bit input means having a plurality of common output lines, said security bit input means also including output line selection means for selecting the output lines upon which said security bits are provided; and
   means for sequentially actuating said security bit input means whereby said security bits are sequentially provided to said computer.

2. The system of claim 1 wherein said output line selection means are switches.

3. The system of claim 2 wherein said switches are binary coded decimal switches whereby said output lines are selected by selecting the binary coded decimal setting of said switch.

4. The system of claim 3 wherein said output lines are individually responsive to a plurality of multi-input terminal logic means conjunctively responsive to said switches and to said means for sequentially actuating.

5. The system of claim 1 or 4 wherein said means for sequentially actuating includes a counter.

6. The system of claim 5 wherein said means for sequentially actuating further includes decoder means responsive to said counter.

7. The system of claim 6 wherein said counter is a four bit counter and said decoder is a four-line to ten-line decoder.

8. The system of claim 6 further including means responsive to said decoder for applying parameter inputs after said security code is input.

9. The system of claim 1 or 4 further including means for applying parameter inputs after said security code is input.

* * * * *